United States Patent [19]

Svehaug

[11] Patent Number: 5,193,252
[45] Date of Patent: Mar. 16, 1993

[54] QUICK-RELEASE CLEAT

[76] Inventor: Oswald C. Svehaug, 1010 San Ysidro Blvd., San Ysidro, Calif. 92073

[21] Appl. No.: 871,136

[22] Filed: Apr. 20, 1992

[51] Int. Cl.[5] .......................................... A44B 21/00
[52] U.S. Cl. ............................... 24/115 G; 24/129 R; 24/130; 24/136 R
[58] Field of Search ............ 24/135 R, 135 A, 135 K, 24/135 L, 136 R, 136 L, 115 R, 115 M, 503, 300, 115 F, 115 H, 130, 129 R, 129 A

[56] References Cited

U.S. PATENT DOCUMENTS

| | | | |
|---|---|---|---|
| 297,158 | 4/1884 | Pitney | 24/129 A |
| 520,318 | 5/1894 | Knap | 24/115 R |
| 823,068 | 6/1906 | Mosley | 24/115 G |
| 947,111 | 1/1910 | Lorentz | 24/115 G |
| 1,229,855 | 6/1917 | Alexander | 24/115 G |
| 1,725,748 | 8/1929 | Alexander | 24/115 G |
| 2,385,274 | 9/1945 | Hammond | 24/115 G |
| 2,452,175 | 10/1948 | Atkins | 24/129 R |
| 2,889,848 | 6/1959 | Redmer | 24/130 |
| 4,270,491 | 6/1981 | Cox | 24/115 G |
| 4,373,463 | 2/1983 | Beaudette | 24/129 R |

Primary Examiner—Victor N. Sakran
Attorney, Agent, or Firm—Ralph S. Branscomb

[57] ABSTRACT

A preferably palm-sized cleat which is generally oval in shape defines a passageway for a line to pass completely through the body of the cleat. The body of the cleat has mutually resilient sides which bias internal structure in the body into a locked mode in which the line is gripped by the internal structure and will not slide through the passage way. When the sides of the body are squeezed together, the line is freed and will move freely in either direction through the passageway.

6 Claims, 2 Drawing Sheets

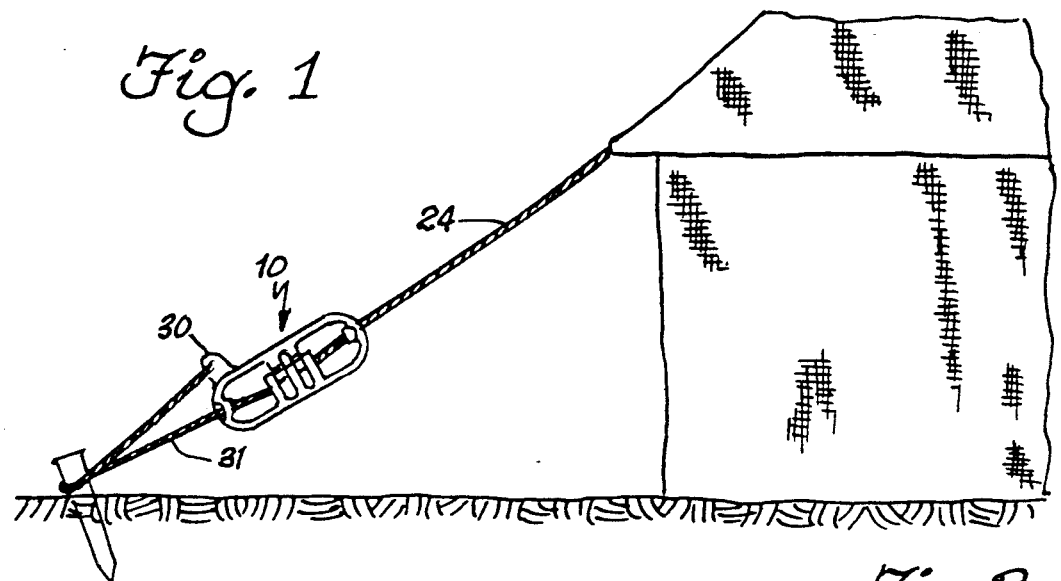
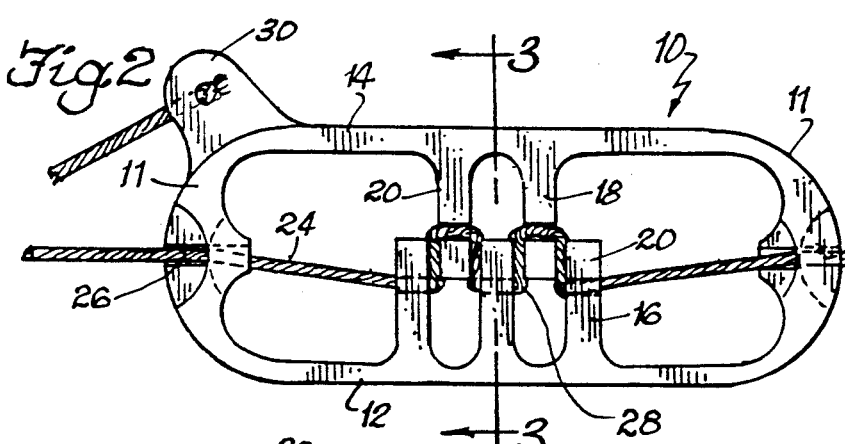
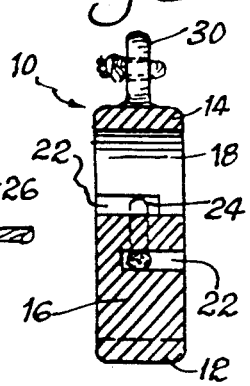
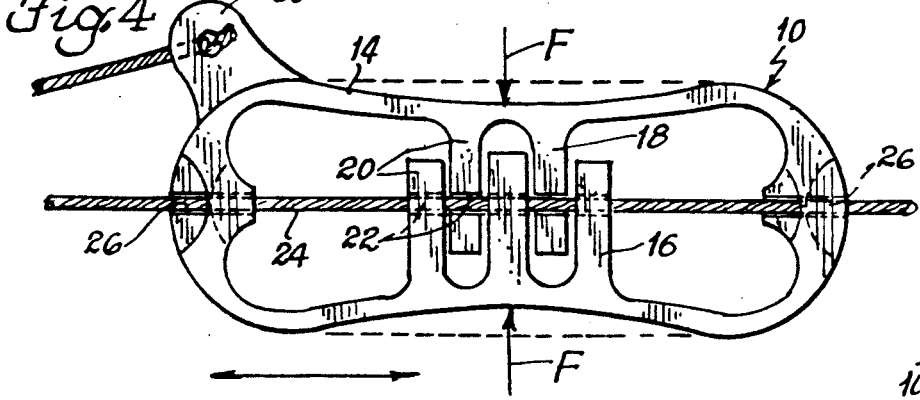
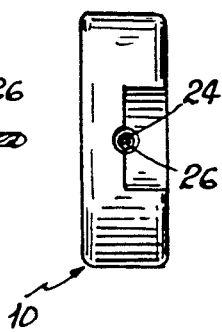

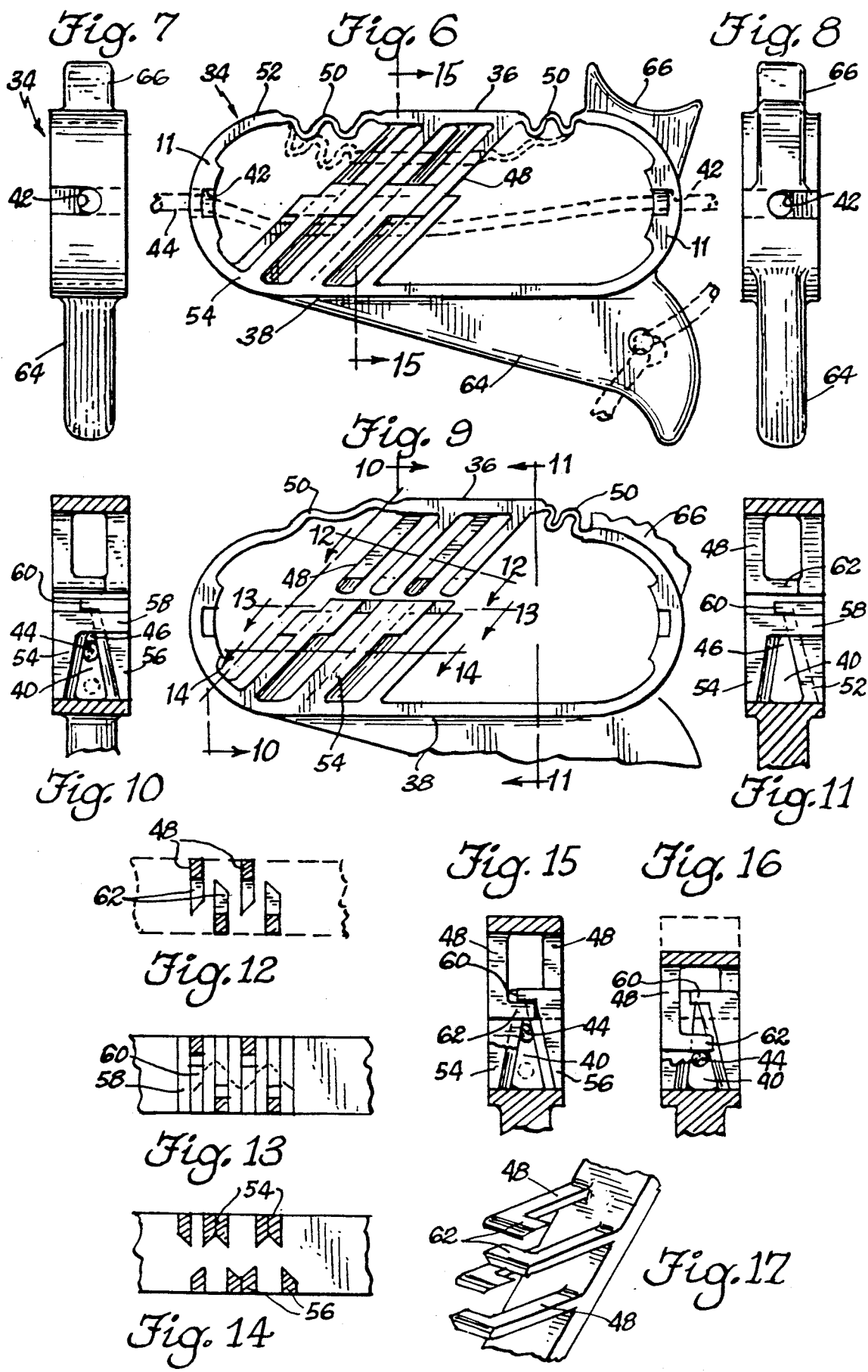

QUICK-RELEASE CLEAT

BACKGROUND OF THE INVENTION

The invention is in the field of cleats and tensioning devices which have two basic modes of operation, a first mode in which they lock onto a line, and a second, release mode in which the line is freed to move longitudinally through the cleat.

Although there are innumerable applications for such cleats, a typical application and one which clearly exemplifies its use is that of a line tieing a tent down to a tent stake. Typically the line is attached to part of the tent, and loops around a stake. The size of the line loop around the stake is then changed to increase or decrease the tension on the line.

Increasing the loop size of a tent hold-down may be done with a simple knot called a tautline hitch which is used by the boy scouts. There are also other commercially available, simple cleat elements, generally involving a very simple piece of metal or plastic having a wedged slot therein, with the bitter end of the line being connected to the larger end of the slot so that when the line is tensioned, it pulls into the converging, wedged end of the slot tightly over the tensioned length of the line.

These means of tensioning lines are simple and easy to use. they are not, however, universally reliable. Jostling of the tent or moving the line may cause the loop fastening to migrate, loosening the line. There is a need, therefore, for a more sophisticated cleat which has the features of a very positive gripping action when it is in the locked mode, and also being susceptible to a very easy, quick one-handed release.

SUMMARY OF THE INVENTION

The instant invention fulfills the above stated needs by providing a cleat in two embodiments, both of which very positively lock a line in place in the cleat in a locked mode, and free the line for longitudinal travel within the cleat when the sides of the cleat are simply squeezed together. The size of the cleat body is preferably palm-sized, although it could be much smaller and be operated merely by compressing the thumb and the forefinger together around the body of the cleat.

In the first embodiment, the sides of the cleat connect to internal, oppositely-directed banks of fingers, with the fingers having corresponding slots defined in them such that when they are properly registered, a clear passageway is defined from one end of the cleat to the other. When misaligned however, the slots on the fingers move into a staggered relation, causing a tremendous friction to exist in the now zig-zag pathway a line must take to pass through the passageway in the cleat body.

In the second embodiment, a series of wedged slots are provided by structure mounted to one side of the cleat, with the other side mounting a plurality of release members which slide interstitially between the slots to press a line free of the converging ends of the slots. Thus, when the body of the cleat is not being compressed, a line drawn in one direction through the wedged slots defining the passageway through the body of the cleat will become tightly wedged into the wedged slots. When the cleat is squeezed, the release members press the line clear of the converging ends of the slots, so that a free passageway is provided through the cleat.

BRIEF DESCRIPTION OF THE DRAWINGS

FIG. 1 illustrates a cleat in use as a tent-down, with the size of the cleat being exaggerated for illustrative purposes;

FIG. 2 is a side elevation view of the cleat, shown transparent to reveal the path of the line through the cleat in its lock mode;

FIG. 3 is a section taken along line 3—3 of FIG. 2;

FIG. 4 is a side elevation view similar to FIG. 2 but with the unit compressed to release the line;

FIG. 5 is a view of the cleat of FIG. 4 as it would be seen from the right end in elevation;

FIG. 6 is a side elevation view of a modification of the cleat;

FIG. 7 (Same as 8 but left end)

FIG. 8 is an end elevation view of the cleat seen from the right end of FIG. 6;

FIG. 9 is a side elevation view of the cleat in its non-compressed mode;

FIG. 10 is a section taken along 10—10 of FIG. 9;

FIG. 11 is a section taken along line 11—11 of FIG. 9;

FIG. 12 is a section taken along line 12—12 of FIG. 9;

FIG. 13 is a section taken along line 13—13 of FIG. 9;

FIG. 14 is a section taken along line 14—14 of FIG. 9;

FIG. 15 is a section taken along line 15—15 of FIG. 6;

FIG. 16 is a view identical to FIG. 15 but with the unit in its compressed, released mode; and FIG. 17 is a perspective view of the side of the cleat body mounting the release members.

DETAILED DESCRIPTION OF THE PREFERRED EMBODIMENTS

The first embodiment is illustrated in FIGS. 1 through 5. In this embodiment, the cleat has a body 10 spring arms 11 and with first and second sides 12 and 14 which define, respectively, first intermitting member 16 and second intermitting member 18. The body is preferably molded as single piece.

Both intermitting members have projections or fingers 20 having slots 22 cut into the sides as best shown in FIG. 3, with the slots in the first intermitting member 16 being entrant in the opposite direction from the slots cut into the second intermitting members 18. By alternating the direction of the cut of the slots, a line 24 entrained through the passageway defined by these slots and the end guideholes 26 cannot slip out of the passageway.

In its quiescent mode, the preferably palm-sized body 10 maintains the configuration illustrated in FIG. 2. The exaggerated serpentine 28 which the line 24 is forced to assume in this mode creates enormous friction resisting the migration of the line in either direction. In order to free the line, the two sides are squeezed as indicated in FIG. 4, aligning the slots 22 to provide a clear passageway through the restricted openings defined by the slots and through the end guideholes 26.

In its typical implementation shown in FIG. 1, the bitter end of the line 24, which is tent tie-down, is attached to a boss 30 extending from the body 10. The loop 30 established between the end of the line and the body 10 can be changed in size to change the tensioning on the line by simply squeezing the body together as shown in FIG. 4, moving the cleat up or down and releasing the cleat so that it assumes the locked mode illustrated in FIG. 2.

It should be noted that use of the cleat is completely fool proof. Once the line has been threaded through the cleat and tied to the perforated boss as shown in FIG. 1, there is no way that the cleat can be oriented that will not securely grip the line when the cleat is released. This makes it ideal for use with tents inasmuch as children and Boy Scouts are so often involved in their use.

Attention is now directed to the second embodiment which is illustrated in FIGS. 7 through 17. The second embodiment addresses the task of cleating somewhat differently than does the first embodiment. The nature of the first embodiment (described above) is such that as tension is increased on the line 24, eventually, ordinarily at a very high tension level, the line will begin to slip through the cleat. This is advantageous in that the cleat can be designed with a pre-set threshold of slippage so that the cleat is not destroyed or the line will not snap. However, there are situations in which one wants an absolute none-slip cleat which automatically increases the grip of the cleat on the line as the line is tensioned. The second embodiment provides this type of cleat.

In the second embodiment, the body 34 of the unit has a first side 36 and a second side 38. The side 38 defines a plurality of tapered or wedged slots 40 that are raked at an angle to the right as shown in FIG. 9. These slots, together with the end guideholes 42, define the pass-through passageway for the line 44, as shown in FIG. 6. The line passes through the end guideholes, and through each of the triangular wedged slots 40. When the two sides of the unit are free to expand into their quiescent mode as shown in FIG. 9 (actually FIG. 9 is over-expanded), the line passageway is substantially straight through the body of the unit.

Whereas the first embodiment was bi-directional in that tensioning was equal irrespective of the direction of pull of the line, this second embodiment is uni-directional. As can be envisioned from inspecting FIGS. 6 and 9, as the line 44 is pulled to the right, it wedges deeper and deeper into the converging ends 46 of the wedged slots 40. The sides of the slots are tapered to define sharp (but not too sharp) edges to bite into the line, but without cutting it. The positioning of the slots relative to the end guideholes 42 are such that as the line is tensioned, it is pressed sideways into the converging ends of the slots. As it is then tugged to the right the angulation of the slots further wedges the line deep into the converging ends of the slot to define a very positive locking action which gets more and more positive as tension on the line increases. There is no safety mechanism built into this cleat to release it before it breaks. As the line is pulled harder and harder, the wedging and locking action gets stronger and stronger until either the line or the cleat breaks. When the cleat and the line are properly matched for size and line texture, there is no chance of slippage of the line in the cleat once the tensioning starts.

To release the line, the side 36 of the body mounts a plurality of release members 48 which pass interstitially between the wedged slots 40 to displace the line out the converging ends 46 of the tapered slots as best shown in FIG. 16. Flexibility of the second side 36 of the body is enhanced by the corrugated portions 50 of the peripheral wall 52 of the body.

The wedged slots are each created by a pair of overlying arms 54 and 56 which are somewhat hockey stick-shaped. As best shown in FIG. 11, arm 54 has a transverse extension 58 which passes completely across the width of the body. The other arm 56 lies against and is bonded to, the extension 58, but has a shorter tab 60 which acts as a retainer for the release member described below. The arms 54 and 56 each provide the appropriate taper and are beveled as best shown in FIG. 11 such that the sharp edges created by the bevel lie in approximately the same plane.

The release member 48 is best shown in action in FIGS. 15 and 16, and as it relates to the side 38, in FIG. 17. Several spaced release members pass interstitially in the airspace created by the arms 54 and 56. Each release member slides in and out in the airspace, but cannot slide completely out because the cross-bar 62 of the release member butts up against the tab 60 of the respective arm 56. This can be seen in FIG. 15. As the sides of the unit are compressed, the sliding action between the arms and the release member can be seen in FIG. 16. The release member 48 moves downward as shown in that Figure, pushing the line 44 out of the wedged slot and freeing it for relatively unfettered longitudinal passage through the passageway.

The essence of the second embodiment of the invention lies in the provision of the wedged slot, or actually a plurality of wedged slots in the preferred embodiment, and the release bar which acts to displace the line from the wedge or wedges as the two sides of the unit are squeezed together. As with the first embodiment, this unit is foolproof. For more convenience of use, the peripheral wall 52 is provided with a palm rest 64 which passes between the thumb and index finger and an index finger rest 66. The other fingers press against the side portion 36. As the unit is squeezed, not only do the sides compress together, there is also a longitudinal component to the motion as indicated in phantom in FIG. 6. The corrugated portions 50 of the side 38 permit this to occur. Under normal circumstances, no matter how tightly the line is wedged into the wedged slots, a relatively soft squeeze will release the line.

Both embodiments can be made with conventional plastic fabrication techniques, utilizing a minimum amount of material to create fool-proof, strong cleats at a minimum cost.

It is hereby claimed:

1. A quick-release cleat comprising
   (a) a cleat body defining a passageway there through for a line to be cleated;
   (b) said body defining at least one wedged slot defining at least one part of said passageway and having a converging end positioned in said body such that as said line is tensioned in said slots said lien wedges into said converging end;
   (c) at least one release member movable from a locked position substantially clear of said wedged slot to a released position urging a line wedged in said at least one wedged slot out of the converging end thereof, and
   wherein said at least one wedged slot is plural to define a plurality of spaced wedged slots and said at least one release member is plural to define a plurality of release members movable between said spaced wedged slots.

2. Structure according to claim 1 wherein said slots are parallel and angled with respect to said passageway such that pulling a line in one direction along said passageway tends to wedge said line into the converging ends of the slots and pulling a line in the other direction in said passageway urges said line out of the converging ends of said wedged, slots.

3. Structure according to claim 2 wherein said body defines a first side and a second side, which sides are resilient with respect to one another, with one side defining said wedged slots and the other side defining said release members such that squeezing said sides together urges a line entrained in said passageway free of said converging ends.

4. Structure according to claim 3 wherein said body is one-piece palm-sized unit having a longitudinal direction substantially defined by the direction of said passageway, and having resilient opposite ends defining guideholes defining the ends of said passageway such that a line pulled through said passageway in one direction wedges into the converging hands of said slots and squeezing the sides of said body together frees the line from the converging ends of said wedged slots to permit free passage of said line through said passageway.

5. Structure according to claim 4 wherein said body is molded an defines at least one corrugated section to increase the resilience of each of said sides relative to the other of said sides.

6. Structure according to claim 4 wherein one of said sides defines finger grip scallops to facilitate gripping of the body

* * * * *